United States Patent

Sakurai

[11] Patent Number: 5,486,875
[45] Date of Patent: Jan. 23, 1996

[54] IMAGE SIGNAL PROCESSING DEVICE

[75] Inventor: Katsuhito Sakurai, Kanagawa, Japan

[73] Assignee: Canon Kabushiki Kaisha, Tokyo, Japan

[21] Appl. No.: 904,188

[22] Filed: Jun. 25, 1992

[30] Foreign Application Priority Data

Jul. 2, 1991 [JP] Japan .................... 3-161518

[51] Int. Cl.$^6$ .................................. H04N 9/65
[52] U.S. Cl. .................................. 348/642
[58] Field of Search .................. 358/19, 23, 24,
358/25, 30, 28, 40, 12, 13, 16, 326, 18,
34, 33, 171, 172; H04N 9/65, 9/64, 9/45,
9/455

[56] References Cited

U.S. PATENT DOCUMENTS

| | | | |
|---|---|---|---|
| 4,338,580 | 7/1982 | Gay | 348/724 |
| 4,551,749 | 11/1985 | Narita | 358/28 |
| 4,654,607 | 3/1987 | Ishikawa | 348/724 |
| 4,724,405 | 2/1988 | Matthies et al. | 348/707 |

FOREIGN PATENT DOCUMENTS

| | | | |
|---|---|---|---|
| 2839061 | 3/1979 | Japan | 358/23 |
| 0008115 | 6/1979 | Japan | 358/23 |
| 0104240 | 8/1979 | Japan | 358/23 |
| 0019413 | 1/1984 | Japan | 358/23 |
| 0184077 | 8/1986 | Japan | H04N 9/65 |
| 0136994 | 6/1987 | Japan | H04N 6/87 |
| 0154992 | 7/1987 | Japan | H04N 9/65 |
| 0206988 | 9/1987 | Japan | H04N 9/65 |

*Primary Examiner*—James J. Groody
*Assistant Examiner*—Michael H. Lee
*Attorney, Agent, or Firm*—Robin, Blecker, Daley & Driscoll

[57] ABSTRACT

An image signal processing device according to the present invention is a device for processing an image signal. The device is provided with a first differential amplifier for receiving a color-difference signal and a reference signal, a second differential amplifier for receiving a burst flag signal and the reference signal, and a modulator for receiving together signals outputted from the first and second differential amplifiers and modulating the received signals by using a carrier signal. Accordingly, it is possible to add the burst flag signal to the color-difference signal and modulate the obtained sum signal by means of a simple arrangement and without the need for complicated adjustment.

8 Claims, 4 Drawing Sheets

IMAGE SIGNAL PROCESSING DEVICE

BACKGROUND OF THE INVENTION

1. Field of the Invention

The present invention relates to an image signal processing device for processing an image signal.

2. Description of the Related Art

A color encoder for modulating base-band color-difference signals into a chrominance signal has heretofore been known as one example of an image signal processing device for processing an image signal.

Such a color encoder has a circuit arrangement, for example, such as that shown in FIG. 1. In the shown circuit arrangement, burst flags (R-Y.BF and B-Y.BF) are added to base-band color-difference signals (R-Y and B-Y in FIG. 1) by burst adding circuits 41 and 42, respectively, and the outputs of the burst adding circuits 41 and 42 are respectively clamped by clamping circuits 43 and 44. The outputs of the respective clamping circuits 43 and 44 are balanced-modulated in balanced modulators 45 and 46 by using subcarrier signals SC90 and SC which are 90° out of phase with each other, and the outputs of the balanced modulators 45 and 46 are added together in an adder 47, whereby a chrominance signal to which the burst signals have been added is formed from the base-band color-difference signals.

Another circuit arrangement of the color encoder is shown in FIG. 2. In the shown circuit arrangement, the base-band color-difference signals (R-Y and B-Y in FIG. 2) are clamped by clamping circuits 51 and 52, respectively, and the outputs of the respective clamping circuits 51 and 52 are balanced-modulated in balanced modulators 53 and 54 by using the subcarrier signals SC90 and SC which are 90° out of phase with each other. Then, the outputs of the balanced modulators 53 and 54 are added together in an adder 55, whereby the base-band color-difference signals are formed into a chrominance signal. Meanwhile, a burst flag BF is subjected to quadrature two-phase modulation by a quadrature two-phase modulator 56 separately from the base-band color-difference signals, thereby forming a burst signal. The burst signal is added to the chrominance signal outputted from the adder 55 in an adder 57.

However, either of the above-described conventional circuits has a number of disadvantages. For example, either circuit needs a special circuit block for adding burst signals to a chrominance signal. In the circuit shown in FIG. 1, when the burst flags are to be added to the respective base-band color-difference signals, it is necessary to adjust the DC levels of the burst flags to those of the color-difference signals or to adjust the offset levels of the color-difference signals and the burst flags. In the circuit shown in FIG. 2, it is necessary to form different burst signals to be added to a chrominance signal, in accordance with whether a chrominance signal to be formed conforms to the NTSC television system or the PAL television system. Particularly, if a chrominance signal conforming to the PAL television system is to be formed, it is necessary to switch the phase of the burst signal, so that a circuit having a complicated arrangement is needed and it is, therefore, difficult to adjust the circuit.

SUMMARY OF THE INVENTION

It is, therefore, an object of the present invention to provide an image signal processing device which makes it possible to solve the above-described problems.

Another object of the present invention is to provide an image signal processing device capable of adding a burst signal to a color-difference signal and modulating the obtained sum signal by means of a simple arrangement and without the need for complicated adjustment.

To achieve the above-described objects, according to one aspect of the present invention, there is provided an image signal processing device for processing an image signal, which comprises a first differential amplifier for receiving a color-difference signal and a reference signal, a second differential amplifier for receiving a burst flag signal and the reference signal, and a modulator for receiving together signals outputted from the first and second differential amplifiers and modulating the received signals by using a carrier signal.

Another object of the present invention is to provide an image signal processing device capable of adding burst signals to a chrominance signal by means of a simple arrangement and without the need for complicated adjustment.

To achieve the above-described object, according to another aspect of the present invention, there is provided an image signal processing device for processing an image signal, which comprises a first clamping circuit for receiving an R-Y signal and a burst flag signal, a second clamping circuit for receiving a B-Y signal and a burst flag signal, a first modulator for modulating a signal outputted from the first clamping circuit by using a first carrier signal, a second modulator for modulating a signal outputted from the second clamping circuit by using a second carrier signal different from the first carrier signal, and an adder for receiving both a signal outputted from the first modulator and a signal outputted from the second modulator and adding both signals together to form a chrominance signal.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 1:
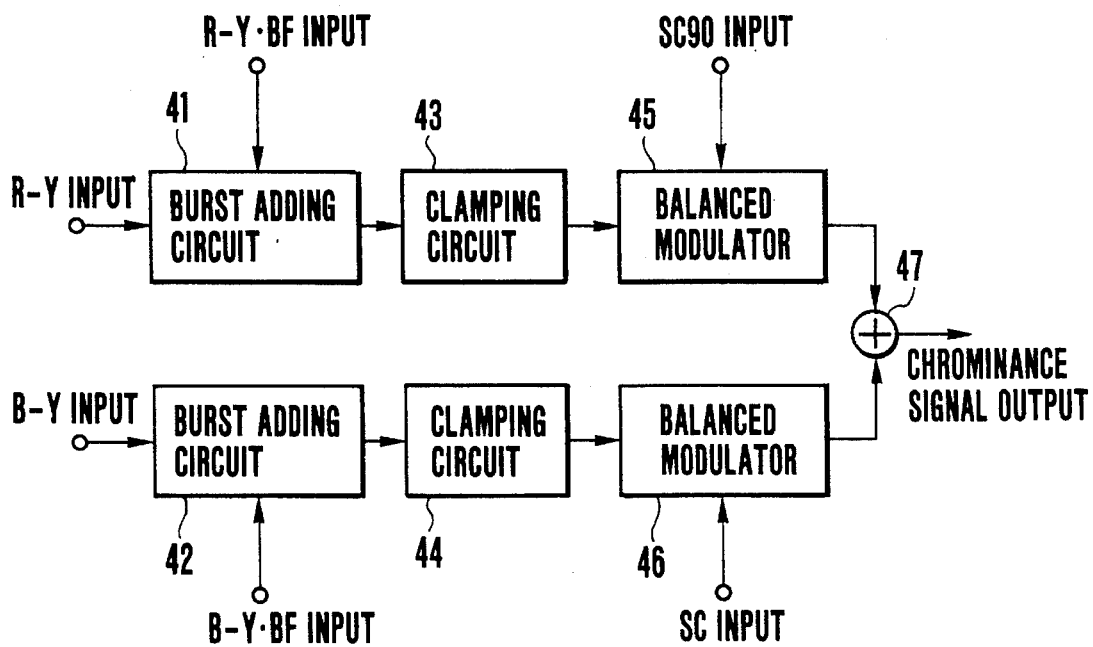
FIG. 1 is a block diagram schematically showing the arrangement of a conventional color encoder having burst-signal adding circuits.
Figure 2:
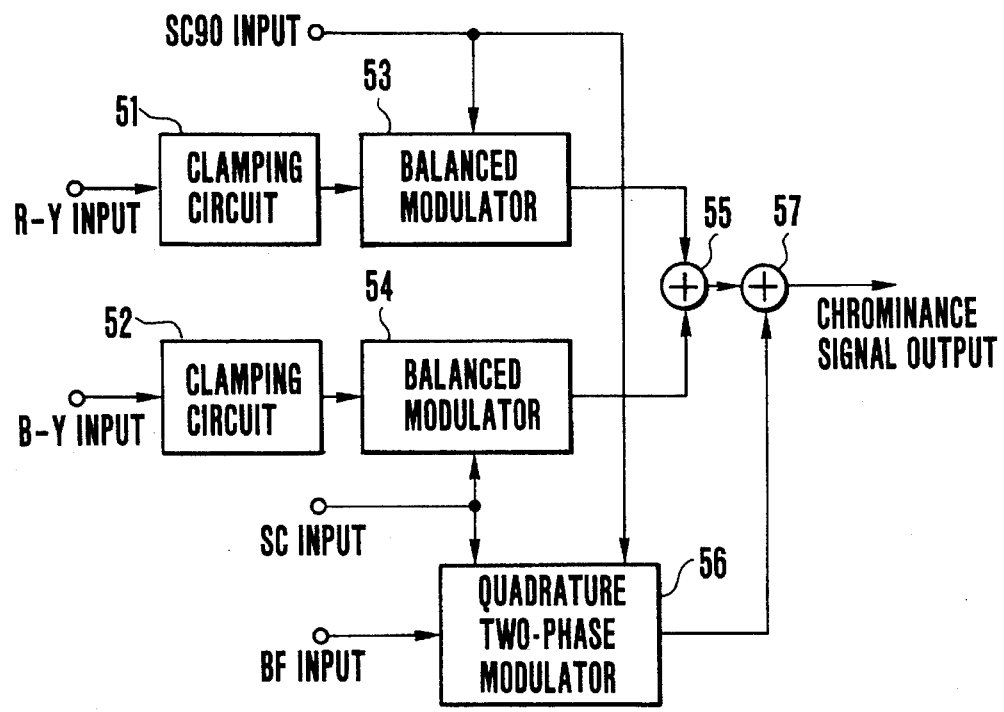
FIG. 2 is a block diagram schematically showing the arrangement of another conventional color encoder having burst-signal adding circuits.
Figure 3:
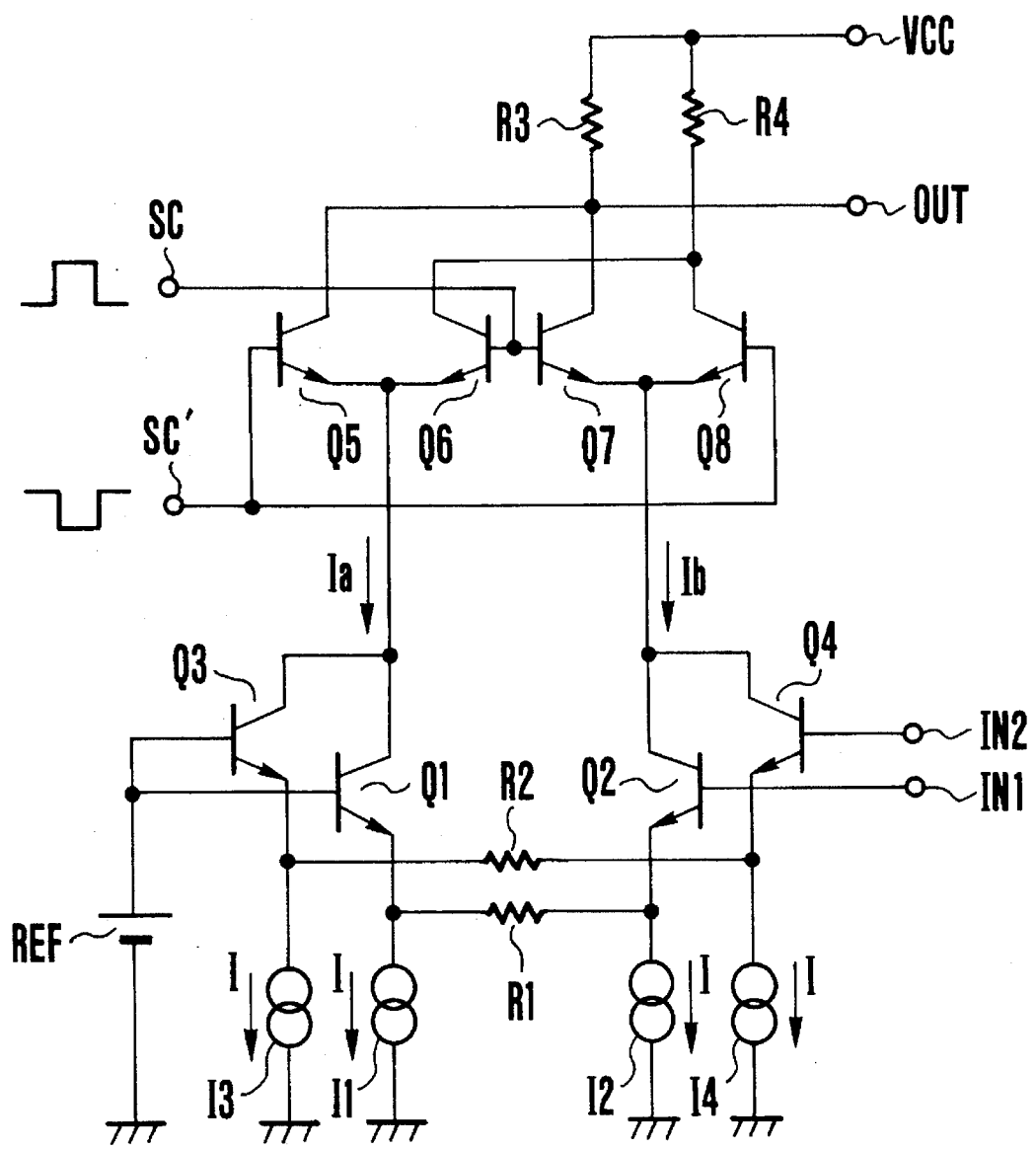
FIG. 3 is a circuit diagram showing the arrangement of a burst-signal adding circuit to which one embodiment of the present invention is applied.

FIG. 3 is a circuit diagram showing a burst-signal adding circuit to which one embodiment of the present invention is applied.

The circuit shown in FIG. 3 includes transistors Q1 to Q8, resistors R1 to R4, constant-current sources I1 to I4, a power source VCC, a reference power source REF, an input terminal IN1 for input of a base-band color-difference signal, an input terminal IN2 for input of a burst flag, an input terminal SC for input of a subcarrier signal, an input terminal SC' for input of a phase-inverted subcarrier signal, and an output terminal OUT for output of a modulated signal.

In the circuit shown in FIG. 3, the transistors Q1 and Q2, the resistor R1, and the constant-current sources I1 and I2 constitute a first differential amplifier. One input terminal of the first differential amplifier is connected to the reference power source REF, and the other input terminal of the first differential amplifier is connected to the input terminal IN1 for input of a base-band color-difference signal.

The transistors Q3 and Q4, the resistor R2, and the constant-current sources I3 and I4 constitute a second differential amplifier. One input terminal of the second differential amplifier is connected to the reference power source REF, and the other input terminal of the second differential amplifier is connected to the input terminal IN2 for input of a burst flag.

The outputs of the first differential amplifier and the second differential amplifier are supplied to common signal lines.

The resistor R3 is connected to the transistors Q5 and Q7 as a common load resistor, while the resistor R4 is connected to the transistors Q6 and Q8 as a common load resistor. The transistors Q5 and Q6 are connected to the respective resistors R3 and R4 to constitute a third differential amplifier. The transistors Q7 and Q8 are also connected to the respective resistors R3 and R4 to constitute a fourth differential amplifier. One input terminal of each of the third and fourth amplifiers is connected to an associated one of the common signal lines to which the respective outputs of the first and second differential amplifiers are supplied. The other input terminals of each of the third and fourth amplifiers are respectively connected to the input terminals SC and SC'. The point of connection with the resistor R3 and the transistors Q5 and Q7 is connected to the output terminal OUT.

Figure 4:
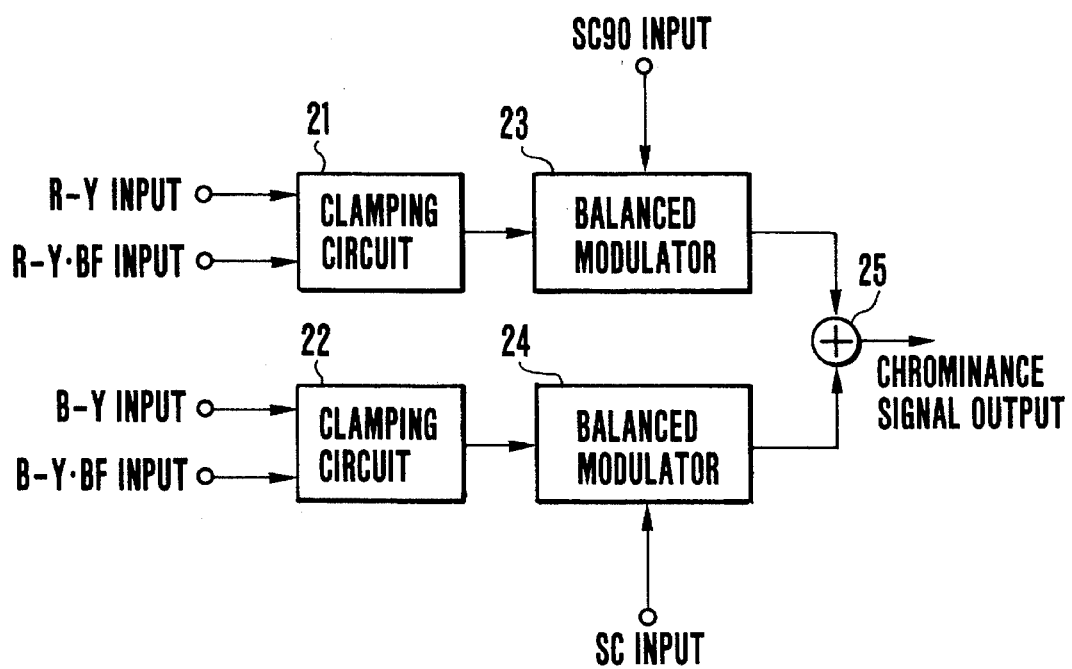
FIG. 4 is a block diagram schematically showing the arrangement of a color encoder to which the burst-signal adding circuit shown in FIG. 3 is applied.

FIG. 4 is a block diagram schematically showing the arrangement of a color encoder to which the burst-signal adding circuit shown in FIG. 3 is applied. In FIG. 4, each of a part including a clamping circuit 21 and a balanced modulator 23 and a part including a clamping circuit 22 and a balanced modulator 24 corresponds to the arrangement shown in FIG. 3.

As shown in FIG. 4, a color-difference signal R-Y and a burst flag R-Y.BF are clamped at a reference voltage (REF) in the clamping circuit 21, whereas a color-difference signal B-Y and a burst flag B-Y.BF are clamped at the reference voltage (REF) in the clamping circuit 22. The output signals of the clamping circuits 21 and 22 are respectively subjected to balanced modulation using subcarrier signals SC90 and SC which are 90° out of phase with each other, in the balanced modulators 23 and 24. Then, the output signals of the balanced modulators 23 and 24 are supplied to an adder 25. The adder 25 adds the input signals together and outputs a chrominance signal to which burst signals have been added.

In the arrangement shown in FIG. 3, the color-difference signal (R-Y or B-Y) inputted through the input terminal IN1 is converted into a current by the resistor R1, while the burst flag (R-Y.BF or B-Y.BF) is converted into a current by the resistor R2.

The color-difference signal which has been converted into the current is outputted as the collector current of each of the differential transistors Q1 and Q2, while the burst flag which has been converted into the current is outputted as the collector current of each of the differential transistors Q3 and Q4. The collector currents of the differential transistors Q1 and Q3 are added together and the resultant current is supplied to the differential transistors Q5 and Q6 as a bias current. Similarly, the collector currents of the differential transistors Q2 and Q4 are added together and the resultant current is supplied to the differential transistors Q7 and Q8 as a bias current.

These bias currents are represented by the following expressions. The bias current for the differential transistors Q5 and Q6 is:

$$Ia=2I-(Vc/R1+Vb/R2)$$

and the bias current for the differential transistors Q7 and Q8 is:

$$Ib=2I+(Vc/R1+Vb/R2)$$

where Vc is the color-difference signal and Vb is the burst flag.

Each of the bias currents is modulated by the subcarrier signals (SC and SC'), and the modulated currents from the differential transistors Q5 and Q7 are supplied to the resistor R3, while the modulated currents from the differential transistors Q6 and Q8 are supplied to the resistor R4. The supplied currents are converted into a voltage by the resistors R3 and R4, and the resultant voltage is then outputted through the output terminal OUT as a signal.

The voltage of the signal outputted through the output terminal OUT is:

$$Vout=VCC-\{2R4.I+R4(Vc/R1+Vb/R2)\}$$

if SC=H and SC'=L or if SC=L and SC'=H, $$Vout=VCC-\{2R4.I-R4(Vc/R1+Vb/R2)\}$$

In this case, the gain of the color-difference signal is determined by R4/R1 and the gain of the burst flag is determined by R4/R2.

The modulated signal obtained by adding the burst flag to the color-difference signal and modulating the sum signal in the above-described manner is outputted from the output terminal OUT of FIG. 3 to the adder 25 of FIG. 4, that is to say, the modulated signal obtained by adding the burst flag R-Y.BF to the color-difference signal R-Y and modulating the sum signal and the modulated signal obtained by adding the burst flag B-Y-BF to the color-difference signal B-Y and modulating the sum signal are outputted to the adder 25 of FIG. 4. The adder 25 adds the input modulated signals together and outputs the sum signal as a chrominance signal.

As is apparent from the above description, according to the arrangement shown as the embodiment described above, since the modulation of the color-difference signal R-Y (or B-Y) and the addition of the burst signal R-Y.BF (or B-Y.BF) to the color-difference signal R-Y (or B-Y) are executed within a single circuit arrangement, there is no need to incorporate an independent circuit block for the addition of the burst signal R-Y.BF (or B-Y.BF). The amplitude of each of the burst signals R-Y.BF and B-Y.BF in the formed chrominance signal can be easily controlled by adjusting the amplitude of the burst flag inputted through the input terminal IN2 shown in FIG. 3. In addition, by selectively enabling or disabling the inputting of the burst flag R-Y.BF shown in FIG. 4, it is possible to easily form a chrominance signal which conforms to the NTSC television system or the PAL television system. Further, if a chrominance signal which conforms to the PAL television system is to be formed, the phases of the respective burst signals in the chrominance signal can be easily controlled by changing the amplitude ratio of the burst flag R-Y.BF to the burst flag B-Y.BF which are shown in FIG. 4.

Figure 5:
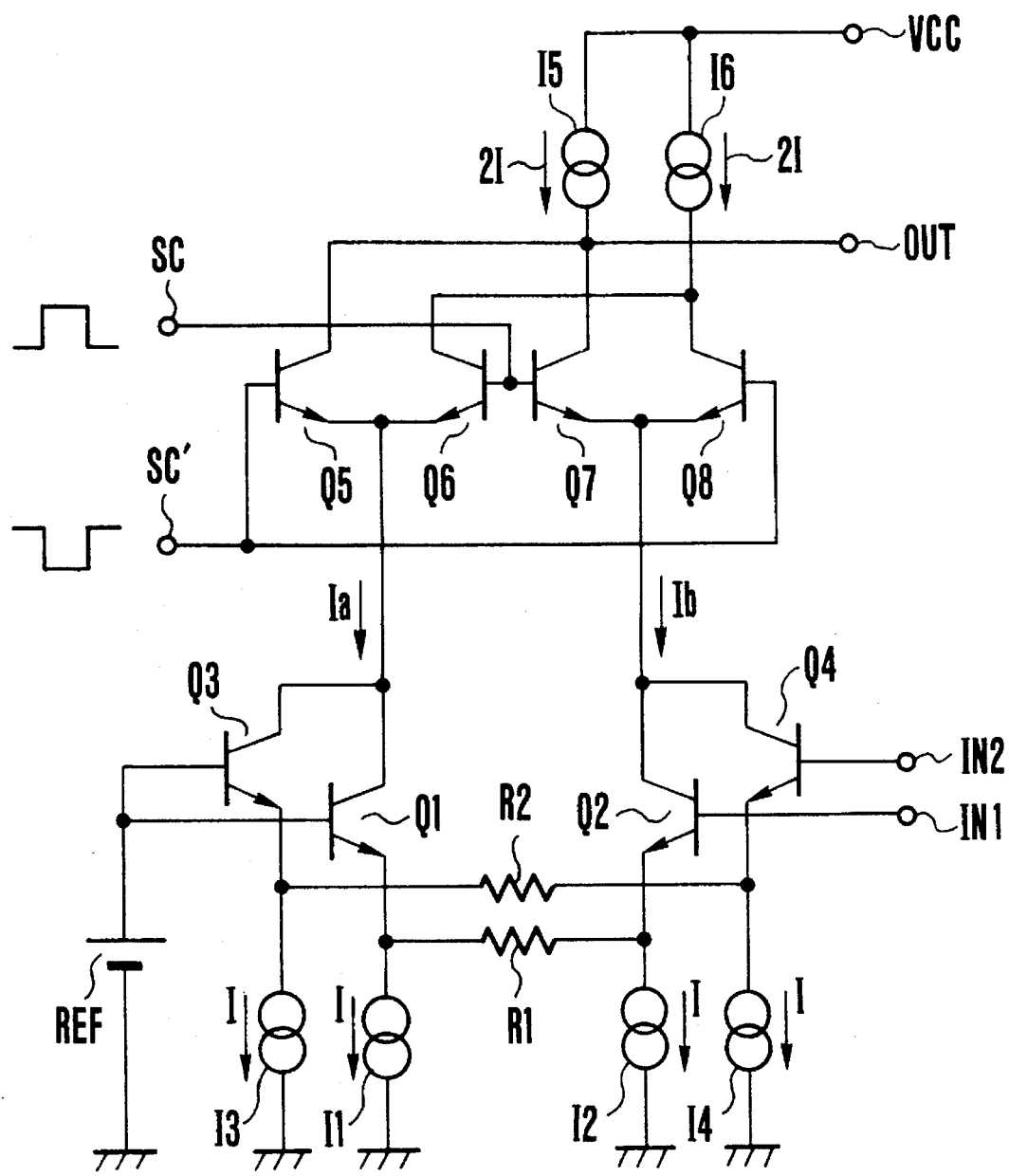
FIG. 5 is a circuit diagram showing a burst-signal adding circuit to which another embodiment of the present invention is applied.

FIG. 5 is a circuit diagram showing a burst-signal adding circuit to which another embodiment of the present invention is applied.

In FIG. 5, the same reference numerals are used to denote elements which are substantially identical to those shown in FIG. 3, and a detailed description is omitted.

In the circuit shown in FIG. 5, elements I5 and I6 are constant-current sources.

The arrangement shown in FIG. 5 differs from that shown in FIG. 3 in that a modulated signal is outputted through the output terminal OUT as a current. The output current is represented as the following expressions.

If SC=H and SC'=L, $$Iout = Vc/R1 + Vb/R2$$

If SC=L and SC'=H, $$Iout = -(Vc/R1 + Vb/R2)$$

Then, modulated signals obtained by adding the respective burst flags R-Y.BF and B-Y.BF to the color-difference signals R-Y and B-Y are outputted to the adder 25. In the adder 25, after the input modulated signals have been added together to form a current sum signal, the current sum signal is converted into a voltage signal, and the voltage signal is outputted as a chrominance signal.

As is apparent from the above description, in the arrangement shown as the embodiment described above, a simple circuit arrangement can be adopted since there is no need to incorporate an independent circuit block for the addition of the burst signal R-Y.BF (or B-Y.BF) to the color-difference signal R-Y (or B-Y). In addition, adjustment is facilitated since the amplitude and phase of each of the burst signals in the chrominance signal can be adjusted by controlling the amplitudes of input burst flags.

As is apparent from the above description, in accordance with the embodiment described above, it is possible to provide an image signal processing device capable of adding burst signals to a chrominance signal by means of a simple arrangement and without the need for complicated adjustment.

What is claimed is:

1. An image signal processing device for processing an image signal, comprising:

(A) a first differential amplifier for receiving a color-difference signal and a reference signal;

(B) a second differential amplifier for receiving a burst flag signal and the reference signal; and (C) a modulator for receiving together signals outputted from said first and second differential amplifiers and modulating the received signals by using a carrier signal.

2. An image signal processing device according to claim 1, wherein said first differential amplifier includes two transistors, a base of one of said two transistors being supplied with the color-difference signal, while a base of the other of said two transistors is supplied with the reference signal.

3. An image signal processing device according to claim 1, wherein said second differential amplifier includes two transistors, a base of one of said two transistors being supplied with the burst flag signal, while a base of the other of said two transistors is supplied with the reference signal.

4. An image signal processing device according to claim 1, wherein said modulator is arranged to balanced-modulate the signals supplied from said respective first and second differential amplifiers by using the carrier signal.

5. An image signal processing for processing an image signal, comprising:

(A) a first clamping circuit having a first terminal for receiving an R-Y signal, and a second terminal for receiving a first burst flag, and being arranged to clamp the R-Y signal received through the first terminal and add the first burst flag received through the second terminal to the received R-Y signal so as to output the R-Y signal added with the first burst flag;

(B) a second clamping circuit having a third terminal for receiving a B-Y signal and a fourth terminal for receiving a second burst flag, and being arranged to clamp the B-Y signal received through the third terminal and add the second burst flag received through the fourth terminal to the received B-Y signal so as to output the B-Y signal added with the second burst flag;

(C) a first modulator for modulating a signal outputted from said first clamping circuit by using a first carrier signal;

(D) a second modulator for modulating a signal outputted from said second clamping circuit by using a second carrier signal different from the first carrier signal; and (E) an adder for receiving both a signal outputted from said first modulator and a signal outputted from said second modulator and adding both signals together to form a chrominance signal.

6. An image signal processing device according to claim 5, wherein the first carrier signal is 90° out of phase with the second carrier signal.

7. An image signal processing device according to claim 5, wherein said first modulator is arranged to balanced-modulate the signal outputted from said first clamping circuit by using the first carrier signal.

8. An image signal processing device according to claim 5, wherein said second modulator is arranged to balanced-modulate the signal outputted from said second clamping circuit by using the second carrier signal.

* * * * *

UNITED STATES PATENT AND TRADEMARK OFFICE
CERTIFICATE OF CORRECTION

PATENT NO. : 5,486,875

DATED : January 23, 1996

INVENTOR(S) : Katsuhito Sakurai

It is certified that error appears in the above-identified patent and that said Letters Patent is hereby corrected as shown below:

Col. 4, line 54, change "B-Y-BF" to -- B-Y.BF --.

Col. 5, line 52, change "'for" to -- for --.

Col. 6, line 21, after "processing" (1st occurrence) insert --device--.

Signed and Sealed this

Twenty-third Day of July, 1996

Attest:

BRUCE LEHMAN

Attesting Officer

Commissioner of Patents and Trademarks